United States Patent
Wang

(10) Patent No.: US 8,720,146 B2
(45) Date of Patent: May 13, 2014

(54) SUSPENDED CEILING STRUCTURE FOR REFRIGERATED STORAGE AND CONSTRUCTION METHOD THEREOF

(75) Inventor: Hong Wang, Guangzhou (CN)

(73) Assignee: Guangzhou Baier Cold-Chain Polyurethane Technology Co., Ltd., Guangzhou (CN)

( * ) Notice: Subject to any disclaimer, the term of this patent is extended or adjusted under 35 U.S.C. 154(b) by 303 days.

(21) Appl. No.: 13/262,631

(22) PCT Filed: Mar. 30, 2010

(86) PCT No.: PCT/CN2010/071424
§ 371 (c)(1),
(2), (4) Date: Oct. 1, 2011

(87) PCT Pub. No.: WO2010/111943
PCT Pub. Date: Oct. 7, 2010

(65) Prior Publication Data
US 2012/0037582 A1   Feb. 16, 2012

(30) Foreign Application Priority Data
Apr. 3, 2009   (CN) .......................... 2009 1 0038372

(51) Int. Cl.
| F27D 1/00 | (2006.01) |
| E04C 2/52 | (2006.01) |
| F27D 1/14 | (2006.01) |
| E04B 9/00 | (2006.01) |

(52) U.S. Cl.
CPC .. *F27D 1/14* (2013.01); *E04B 9/008* (2013.01)
USPC ..................... 52/506.02; 52/220.6; 52/745.19

(58) Field of Classification Search
USPC ............ 52/220.6, 220.1, 220.2, 220.3, 220.4, 52/220.5, 220.7, 220.8, 506.01, 506.03, 52/506.04, 605.05, 506.06, 506.07, 52/506.08, 506.09, 506.1
See application file for complete search history.

(56) References Cited

U.S. PATENT DOCUMENTS

| 1,754,411 | A | * | 4/1930 | Balduf ........................ 52/407.4 |
| 3,930,916 | A | * | 1/1976 | Shelley ........................... 156/71 |
| 4,015,389 | A | * | 4/1977 | Thompson .................. 52/475.1 |
| 4,444,524 | A | * | 4/1984 | Cook et al. .................... 403/387 |
| 4,611,444 | A | * | 9/1986 | Nassof ............................. 52/145 |
| 4,862,663 | A | * | 9/1989 | Krieger ........................ 52/309.7 |
| 5,893,359 | A | * | 4/1999 | Schultheis et al. ........ 126/214 A |
| 6,536,173 | B2 | * | 3/2003 | Rebman .......................... 52/465 |
| 6,701,686 | B1 | * | 3/2004 | Platt ............................ 52/506.07 |

* cited by examiner

*Primary Examiner* — William Gilbert
*Assistant Examiner* — Kyle Walraed-Sullivan

(57) ABSTRACT

A suspended ceiling structure for a refrigerated storage and a construction method thereof are provided. The suspended ceiling structure comprises a ceiling grid which comprises a main grid, hanging members and an attachment grid. An insulating strip made of polyurethane foam is placed on the main grid so as to serve as a cushion block. An upper color-coated steel sheet is provided above the insulating strip and a lower color-coated steel sheet is arranged below the main grid. A thermal break component is arranged between the main grid and the lower steel sheet, and a polyurethane insulating material is sprayed in successive layers between the upper and lower color coated steel sheets. The ceiling structure can improve the insulation effect of the refrigerated storage and save energy.

8 Claims, 4 Drawing Sheets

SUSPENDED CEILING STRUCTURE FOR REFRIGERATED STORAGE AND CONSTRUCTION METHOD THEREOF

FIELD OF THE INVENTION

The present invention relates to a suspended ceiling structure for refrigerated storage and construction method thereof.

BACKGROUND OF THE INVENTION

In the hot season of south and north areas in our country, for extending the retention period of food, it has to create low temperature environment to attain the object. So, it also promoted the rapid development and technical renovation of freezing industry. In freezing industry, in order to conduct storing, transporting and processing of multitudinous freezing products, for example, it is necessary to install refrigerated storage to conduct processing, storing and transporting of freezing products, such as vegetables, fruits, meat, etc. As our country's economy booms, there is already more and more usage of refrigerated storage in national production. The suspended ceiling structure for refrigerated storage is the important part decided the insulation effect is good or bad. At present, the suspended ceiling for refrigerated storage generally adopts refrigerated storage plate splicing suspended ceiling or, although side operation is faster, because of relatively serious cold-air loss phenomenon at the joint among storage plates, consequently, the heat insulation effect of adopting refrigerated storage plate splicing suspended ceiling is poor, especially in the large refrigerated storage, the top of which has huge area; Adopting civil engineering structure need to build upright under civil engineering suspended ceiling, in order to guarantee the soundness and security, in this way, although has good heat insulation effect, upright occupied the space of refrigerated storage, so as to decrease the capacity of the storage.

SUMMARY OF THE INVENTION

The first object of the present invention is to provide a suspended ceiling structure for a refrigerated storage, the second object is to provide a construction method of the suspended ceiling structure for a refrigerated storage, utilizing the structure according to the invention can improve the insulation effect of the refrigerated storage, save energy, increase the capacity of the storage, improve the service life of the refrigerated storage, utilizing the construction method according to the invention can increase the construction efficiency.

In order to attain the first object described above, the suspended ceiling structure for a refrigerated storage in the present invention comprises a ceiling grid which comprises a main grid, hanging members which are connected to the main grid and the refrigerated storage top; An upper color-coated steel sheet is provided above the main grid, an insulating strip is arranged between the upper color-coated steel sheet and the main grid; a lower color-coated steel sheet is arranged below the main grid; A thermal break component is arranged between the main grid and the lower color-coated steel sheet; Space is arranged between the upper and lower color coated steel sheets, in which polyurethane insulating layers are sprayed; the thermal break component comprises heat insulation rod, an upper joint which is connected to the main grid and the heat insulation rod and a lower joint which is connected to the lower end part of the heat insulation rod and the lower color-coated steel sheet.

Because of insulating strip is arranged between main grid and upper color-coated steel sheet, a thermal break component is arranged between the upper color-coated steel sheet and the lower color-coated steel sheet, which contains heat insulation rod, take effect of cold insulation to a large extent, simultaneously, a polyurethane insulating layer is sprayed in successive layers between upper color-coated steel sheet and lower color-coated steel sheet, so as to form a jointless heat insulation layer, hence, the insulation effect and the energy-saving effect of the suspended ceiling structure for a refrigerated storage is good because of the above structure; Because of the suspended ceiling structure for a refrigerated storage adopts connecting the ceiling grid with the refrigerated storage top, and the main grid is packed in the polyurethane insulating layer between the upper color-coated steel sheet and lower color-coated steel sheet, in this way the suspended ceiling structure for a refrigerated storage is compact, firm, has high strength, can attain the operating requirement of strength without upright in the refrigerated storage. Consequently, increase the storage capacity of the refrigerated storage; Since adopting ceiling grid structure, can avoid that jointless polyurethane insulating layer produces flaw because of stress concentration, therefore, the suspended ceiling structure for a refrigerated storage has long service life. Because the upper surface and the lower surface of suspended ceiling structure for a refrigerated storage utilizes a color-coated steel sheet, consequently, the suspended ceiling structure for a refrigerated storage is artistic, safety, fireproofing, according to the requirement of food hygienic standard.

Preferably, the ceiling grid also comprises the attachment grid, the attachment grid is pyramid-formed grid, the tip of pyramid-formed grid connects with hanging members, the base of pyramid-formed grid connects with the main grid. Adopting this structure can enhance the strength of the ceiling grid.

Preferably, a joint steel strip is connected to the lower end of the joint, galvanized parts are arranged on the joint steel strip. In this way, it is convenient to install the lower color-coated steel sheet.

As the embodiment of the invention, the upper joint is an upper screw bolt, the lower joint is a lower screw bolt, the heat insulation rod is high impact Polypropylene insulation rod, an upper metal sleeve with internal thread is inlaid in the upper end part of the high impact Polypropylene insulation rod, a lower metal sleeve with internal thread is inlaid in the lower end part of the high impact Polypropylene insulation rod, the upper screw bolt connects to the high impact Polypropylene insulation rod through the upper metal sleeve, the lower screw bolt connects to the high impact Polypropylene insulation rod through the lower metal sleeve. The structure that the joint arranged to screw bolt is simply, has wide scope of application, and high connection strength; inlaying the upper metal sleeve with internal thread in the upper end part of the high impact Polypropylene insulation rod, can guarantee the good connection strength of the upper screw bolt and high impact Polypropylene insulation rod, inlaying the lower metal sleeve with internal thread in the lower end part of the high impact Polypropylene insulation rod, can guarantee the good connection strength of the lower screw bolt and high impact Polypropylene insulation rod.

As the embodiment of the invention, the main grid is square-formed grid, the square-formed grid comprises main girder and secondary girder, the main girder is C-type steel, the secondary girder is angle iron, the secondary girder and the main grid are fixed together. Adopting square-formed grid, the structure is simple, convenient to manufacture, Adopting C-type steel, in this way can magnify the strength of the main grid; the secondary girder adopts the angle iron, in this way can save consumables.

As the embodiment of the invention, the insulating strip is polyurethane foam block. The heat insulation effect of this kind of material is well.

In order to attain the second object described above, a construction method of the suspended ceiling structure for a refrigerated storage, its steps as follow:

Confirming the suspended point location, manufacturing the main grid, and connecting the main grid with the hanging members.

Placing the insulating strip made of polyurethane foam block on the main grid.

Providing the upper color-coated steel sheet on the upper surface of the insulating strip as the spraying substrate of the polyurethane;

Disposing thermal break component: the upper joint is connected to the main grid, connection steel strip is connected to one end of the lower joint, afterwards, one end of the heat insulation rod is connected to the upper joint joint, one end far from the connection steel strip of the lower joint is connected to the heat insulation rod;

Spraying polyurethane in successive layers on the lower surface of the upper color-coated steel sheets, the spraying thickness of the first layer is 10-15 mm, the spraying thickness of the second layer is 15-25 mm, the spraying thickness of the third layer is 25-35 mm, the spraying thickness of each layer after the third layer is 25-35 mm until the polyurethane heat insulation layers are sprayed over. Removing the polyurethane foam on the connection steel strip, connect the galvanized parts with the connection steel strip, then, repeating spraying the polyurethane on the polyurethane layers already sprayed;

Installing the lower color-coated steel sheet on the galvanized parts.

By adopting the above-mentioned construction method, because the construction progress can be accomplished in continuous construction time, while the civil engineering suspended ceiling need to be accomplished in intermittent construction time, consequently, can increase the construction efficiency; Since the polyurethane insulating layers adopt the process of spraying in successive layers, in this way, the polyurethane is a jointless heat insulation layer, hence, the effect of heat insulation is well.

Preferably, a pyramid-formed grid is connected between the hanging members and the main grid, the tip of pyramid-formed grid connects with hanging members, the base of pyramid-formed grid connects with the main grid. In this way, it can enhance the strength of the ceiling grid.

Preferably, the main grid is square-formed grid, the manufacturing method of the main grid is square-formed grid is: welding at least two main girders on the hanging members in parallel and transversely. Then, welding at least two secondary girder on the main girder longitudinally. The manufacturing method is simple and highly-efficient.

As the embodiment of the invention, during the disposing and operating of the thermal break component, the upper joint is an upper screw bolt, the lower joint is a lower screw bolt, the heat insulation rod is high impact Polypropylene insulation rod; the upper screw bolt is welded on the main grid, the joint steel strip is welded with the lower end of the lower joint, afterwards, the high impact Polypropylene insulation rod the upper screw bolt through thread, in turn, the lower screw bolt connects to the high impact Polypropylene rod through thread. Since the connection between the upper screw bolt and the main grid is weld, the connection between the joint steel strip and the lower joint is weld and the welded temperature is high, using the disposure method of thermal break component described above can guarantee the high impact Polypropylene insulation rod against burning-out.

DETAILED DESCRIPTION OF THE INVENTION

Then describe specifically the instant invention combined with the exemplary embodiments and the appended drawings.

The First Embodiment

Figure 1:
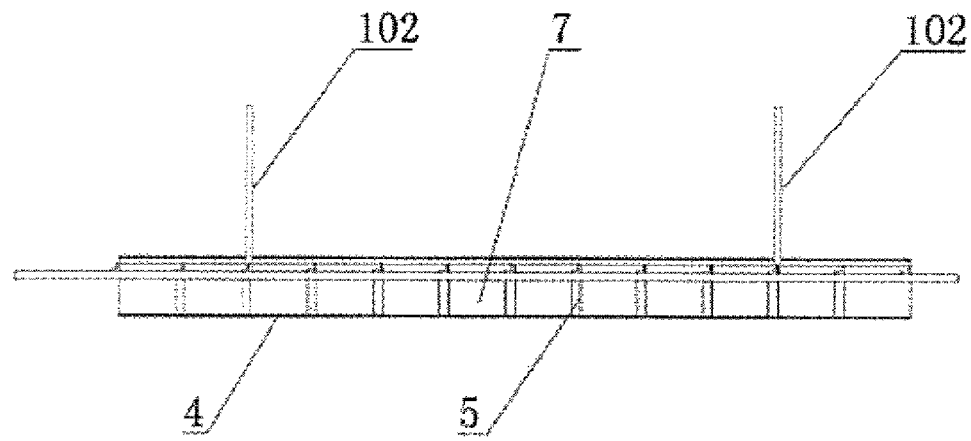
FIG. 1 is a schematic diagram of the suspended ceiling structure for a refrigerated storage according to a first embodiment of the invention.
Figure 2:
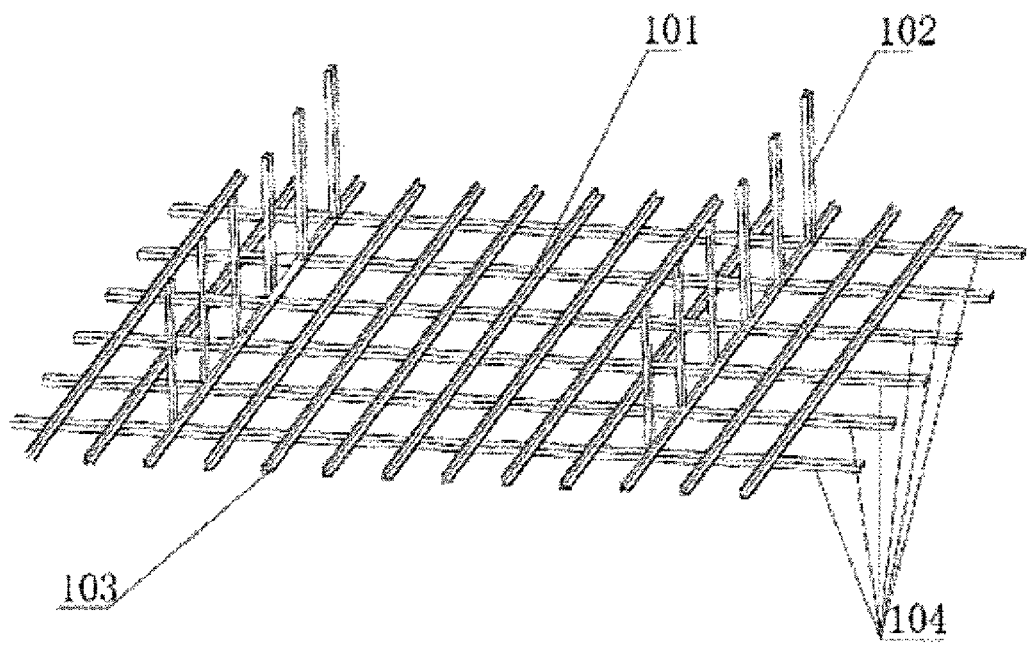
FIG. 2 is a schematic diagram of the suspended ceiling structure of the first embodiment.
Figure 3:
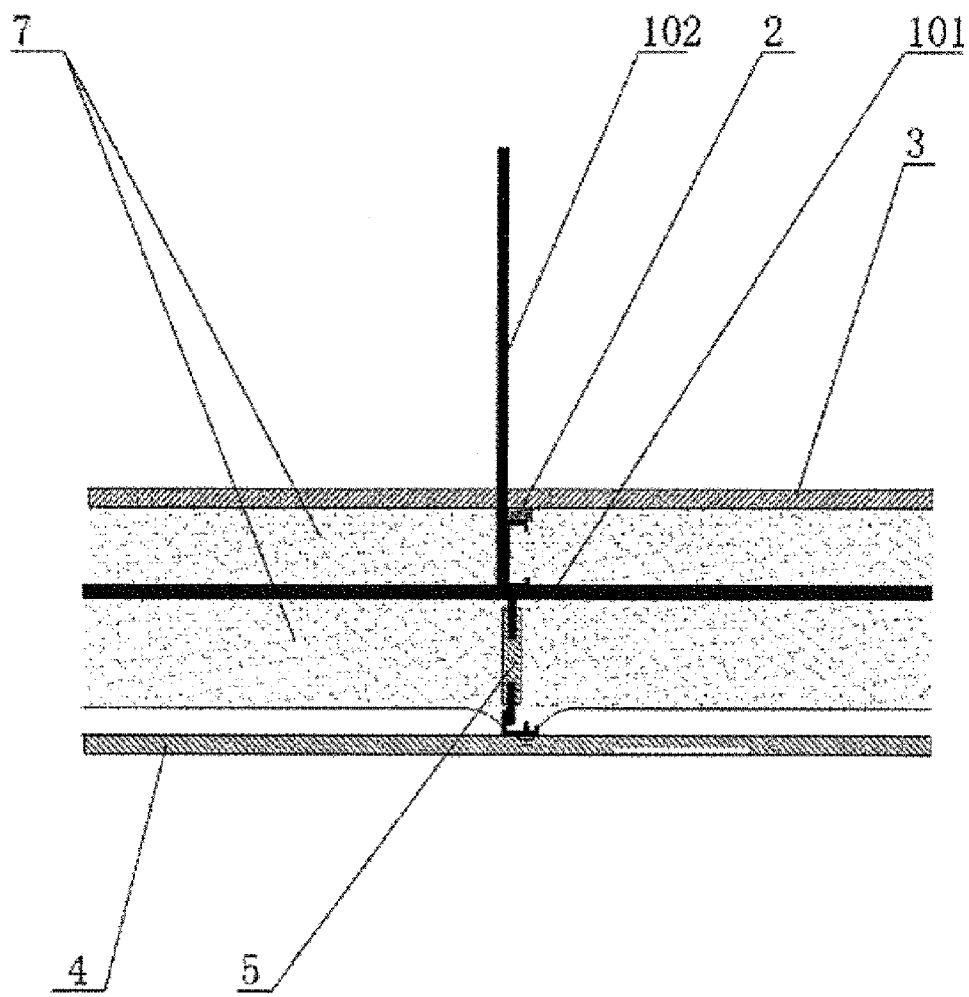
FIG. 3 is a sectional view of the suspended ceiling structure for a refrigerated storage according to the first embodiment.
Figure 7:
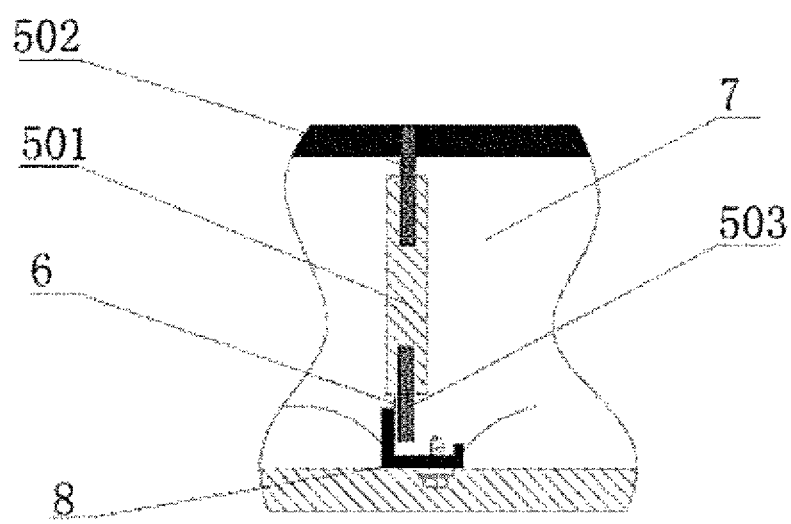
FIG. 7 is the schematic diagram of thermal break component.

The suspended ceiling structure for a refrigerated storage as shown in FIG. 1 and FIG. 3, comprises a ceiling grid, the ceiling grid as shown in FIG. 2, comprises a main grid 101 and hanging members 102, the main grid 101 comprises main girder 103 and secondary girder 104, the main grid 101 is square-formed structure, the main girder 103 places transversely or longitudinally, the secondary girder 104 places longitudinally or transversely, the main grid 101 adopting C-type steel to manufacture, in this way, the strength of the ceiling grid can be enhanced, the secondary girder 104 adopting angle iron to manufacture, materials can be saved in this way, the angle iron is welded under the C-type steel, the hanging members 102 is welded on the main grid 103; at least two the polyurethane foam cushion block 2 placed on the upper surface of the main grid 104. An upper color-coated steel sheet 3 is provided above the polyurethane foam block 2; a lower color-coated steel sheet 4 is arranged below the main girder 103, Space is arranged between the upper and lower color coated steel sheets 3, 4. A thermal break component 5 is arranged between the main grid 101 and the lower color-coated steel sheet 4, the structure of thermal break component 5 as shown in FIG. 7, comprises high impact Polypropylene insulation rod 501, an upper metal sleeve not shown with internal thread is inlaid in the upper end part of the high impact Polypropylene insulation rod 501 lower metal sleeve not shown with internal thread is inlaid in the lower end part of the high impact Polypropylene insulation rod 501, the upper screw bolt 502 is connected on the upper metal sleeve, the other end of the upper screw bolt 502 is connected on the main girder 103, the lower screw bolt 503 is connected on the lower metal sleeve; as shown in FIG. 7, one end far from the high impact Polypropylene insulation rod 501 of the lower screw bolt 503 is connected to connection steel strip 6, the galvanized parts 8 is connected on the connection steel strip 6, the galvanized parts 8 is L-formed, and a screwed hole is drilled on one end far from the lower screw bolt 503; the lower color-coated steel sheet 4 fixed on the galvanized parts 8 through bolts; the polyurethane insulating layers are sprayed between the upper and lower color coated steel sheets 3, 4.

The construction steps of the suspended ceiling structure for a refrigerated storage with this kind of structure are:

I. Confirming the suspended point location, manufacturing the square-formed main grid 101 as follows: the main girder 103 adopting C-type steel is welded on the hanging members 102 transversely or longitudinally, the distance between the main girder 103s arranged according to the area of The top of the refrigerated storage, then the secondary girder 104 is welded on the main girder 103 adopting angle iron longitudinally or transversely, similarly, the distance between the secondary girder 104s arranged according to the area of the top of the refrigerated storage; the length of the hanging members 102 is confirmed according to the form of the top of the refrigerated storage; the main grid 101 is manufactured to the same form with the top of the refrigerated storage or plane.

II. Arranging at least two insulating strip made of the polyurethane foam block 2 on the main girder 103;

III. Providing the upper color-coated steel sheet 3 on the upper surface of the insulating strip 2 as the spraying substrate of the polyurethane;

IV. Disposing thermal break component 5 as follows: the upper screw bolt 502 is welded on the main grid 101, the joint steel strip 6 is welded with the lower end of the lower joint 503, afterwards, the high impact Polypropylene insulation rod 501 the upper screw bolt 502 through thread, in turn, the lower screw bolt 503 connects to the high impact Polypropylene insulation rod 501 through thread.

V. Spraying polyurethane in successive layers took the upper color-coated steel as the spraying substrate, when spray polyurethane, the spraying thickness of the first layer is 10-15 mm, the spraying thickness of the second layer is 15-25 mm, the spraying thickness of the third layer is 25-35 mm, the spraying thickness of each layer after the third layer is 25-35 mm until the polyurethane heat insulation layers are sprayed over.

VI. Removing the polyurethane material on the lower end of the connection steel strip 6, and connecting the galvanized parts 8 on the connection steel strip 6 with bolts;

VII. Installing the lower color-coated steel sheet 4 on the galvanized parts 8 through bolts The suspended ceiling structure for a refrigerated storage adopting this structure, since the polyurethane between the upper 3 and lower 4 color coated steel sheets adopts the process of spraying, forms a jointless heat insulation layer, an insulating strip 2 is arranged between the upper color-coated steel sheet 3 and the main grid 101. A thermal break component 5 is arranged between the main grid 101 and the lower color-coated steel sheet 4, in this way, the refrigeration capacity is difficult to deliver outward, hence, the insulation effect is good; Since adopting ceiling grid structure, and the main grid 101 places between the upper color-coated steel sheet 3 and lower color-coated steel sheet 4, is packed in the polyurethane insulating layer at the same time, in this way, polyurethane insulating layer will not produce flaw because of stress concentration, therefore, the suspended ceiling structure for a refrigerated storage has long service life; Because the upper surface and the lower surface of suspended ceiling structure for a refrigerated storage adopt color-coated steel sheet, consequently, the suspended ceiling structure for a refrigerated storage is artistic, safety, fireproofing, accord with the requirement of food hygienic standard. Adopt the construction method mentioned above, because the construction progress can be accomplished in continuous construction time, while the civil engineering suspended ceiling need to be accomplished after build upright, consequently, can increase the construction efficiency; Since the polyurethane insulating layers adopt the process of spraying in successive layers, in this way, the polyurethane is a jointless heat insulation layer, hence, the effect of heat insulation is well. Because did not arranged upright supported the suspended ceiling structure for a refrigerated storage, and the form of the suspended ceiling structure for the refrigerated storage can manufactured according to the form of the top of the refrigerated storage, consequently, the storage capacity is huge; when dispose thermal break component 5, since the connection between the upper screw bolt 502 the main grid 101 is weld, the connection between the joint steel strip 6 and the lower joint 503 is weld, welded temperature is high, adopting the disposure method of thermal break component 5 described above can guarantee the high impact Polypropylene insulation rod 501 against burning-out.

The Second Embodiment

Figure 4:
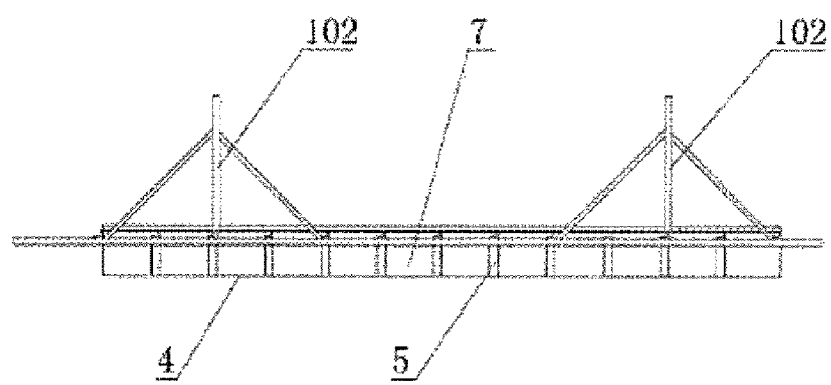
FIG. 4 is a schematic diagram of the suspended ceiling structure for a refrigerated storage according to a second embodiment of the invention.
Figure 5:
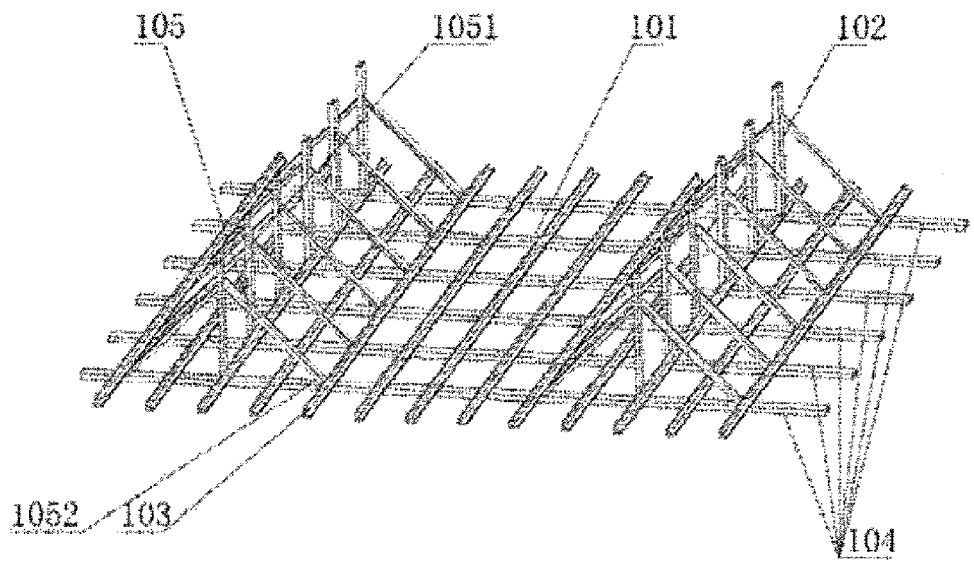
FIG. 5 is a schematic diagram of the suspended ceiling structure according to the second embodiment.
Figure 6:
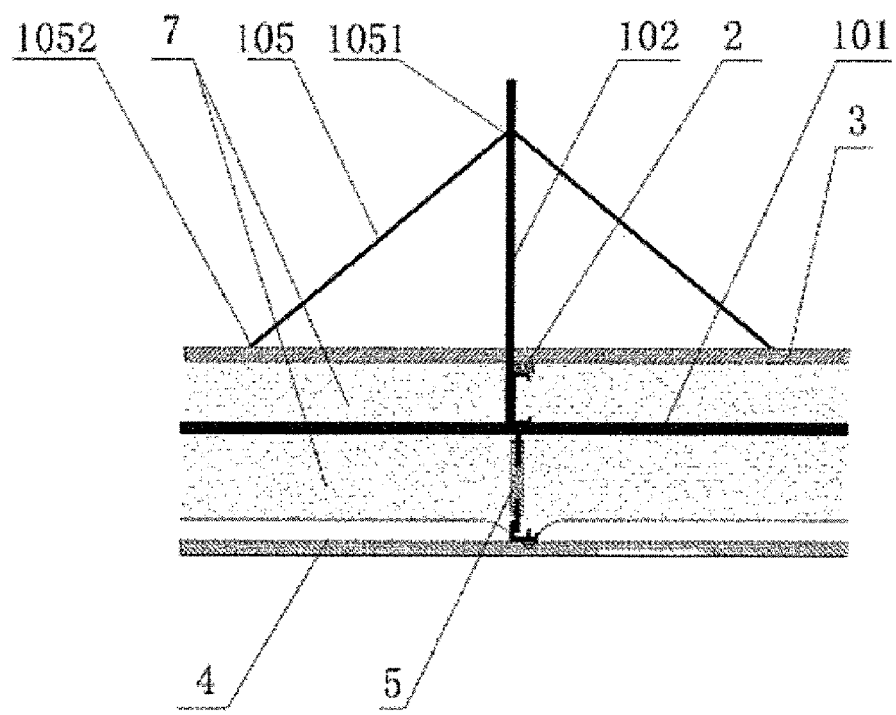
FIG. 6 is a sectional view of the suspended ceiling structure for a refrigerated storage according to the second embodiment.

The suspended ceiling structure for a refrigerated storage as shown in FIG. 4 and FIG. 6, comprises a ceiling grid, the ceiling grid as shown in FIG. 5, comprises a main grid 101 and hanging members 102 and an attachment grid with pyramid-formed, the main grid 101 comprises main girder 103 and secondary girder 104, the main grid 101 is square-formed structure, the main girder 103 is welded on the hanging members 102 transversely or longitudinally the secondary girder 104 places longitudinally or transversely, the main grid 101 adopting C-type steel to manufacture, in this way, can enhance the strength of the ceiling grid, the secondary girder 104 adopting angle iron to manufacture, in this way can save materials, the angle iron is welded under the C-type steel, the tip of pyramid-formed grid connects with hanging members 102, the base of pyramid-formed grid connects with the main grid 101, Adopting stayed-cable pyramid-formed grid can enhance the strength of the ceiling grid; the hanging members 102 is welded on the main grid 101; a layer polyurethane foam block 2 placed on the upper surface of the main grid 101. An upper color-coated steel sheet 3 is provided above the polyurethane foam block 2; a lower color-coated steel sheet 4 is arranged below the main girder 103, Space is arranged between the upper and lower color coated steel sheets 3, 4. A thermal break component 5 is arranged between the main girder 103 and the lower color-coated steel sheet 4, the structure of thermal break component 5 as shown in FIG. 7, comprises high impact Polypropylene insulation rod 501, an upper metal sleeve not shown with internal thread is inlaid in the upper end part of the high impact Polypropylene insulation rod 501 lower metal sleeve not shown with internal thread is inlaid in the lower end part of the high impact Polypropylene insulation rod 501, the upper screw bolt 502 is connected on the upper metal sleeve, the other end of the upper screw bolt 502 is connected on the main girder 103, the lower screw bolt 503 is connected on the lower metal sleeve; as shown in FIG. 7, one end far from the high impact Polypropylene insulation rod 501 of the lower screw bolt 503 is connected to connection steel strip 6, the galvanized parts 8 is connected on the connection steel strip 6, the galvanized parts 8 is L-formed, a screwed hole is drilled on one end far from the lower screw bolt 503; the lower color-coated steel sheet 4 fixed on the galvanized parts 8 through bolts; the polyurethane insulating layers are sprayed between the upper and lower color coated steel sheets 3, 4.

The construction steps of the suspended ceiling structure for a refrigerated storage with this kind of structure are:

I. Confirming the suspended point location, manufacturing the square-formed main grid 101 as follows: the main girder 103 adopting C-type steel is welded on the hanging members 102 transversely or longitudinally, the distance between the main girder 103s arranged according to the area of The top of the refrigerated storage, then the secondary girder 104 is welded on the main girder 103 adopting angle iron longitudinally or transversely, similarly, the distance between the secondary girder 104s arranged according to the area of the top of the refrigerated storage; the length of the hanging members 102 is confirmed according to the form of the top of the refrigerated storage; the pyramid-formed grid is welded on the main grid 101 and the hanging members 102; the main grid 101 is manufactured to the same form with the top of the refrigerated storage or plane.

II. Arranging at least two insulating strips 2 made of polyurethane foam block on the main girder 103;

III. Providing the upper color-coated steel sheet 3 on the upper surface of the insulating strip 2 as the spraying substrate of the polyurethane;

IV. Disposing thermal break component 5, steps are: the upper screw bolt 502 is welded on the main grid 101, the joint steel strip 6 is welded with the lower end of the lower joint 503, afterwards, the high impact Polypropylene insulation rod 501 the upper screw bolt 502 through thread, in turn, the lower screw bolt 503 connects to the high impact Polypropylene insulation rod 501 through thread.

V. Spraying polyurethane in successive layers took the upper color-coated steel as the spraying substrate, when spray polyurethane, the spraying thickness of the first layer is 10-15 mm, the spraying thickness of the second layer is 15-25 mm, the spraying thickness of the third layer is 25-35 mm, the spraying thickness of each layer after the third layer is 25-35 mm until the polyurethane heat insulation layers are sprayed over.

VI. Removing the polyurethane material on the lower end of the connection steel strip, connecting the galvanized parts 8 on the connection steel strip 6 with bolts;

VII. Installing the lower color-coated steel sheet 4 on the galvanized parts 8 through bolts By adopting this structure, since the polyurethane between the upper and lower color coated steel sheets 3, 4 adopts the process of spraying, forms a jointless heat insulation layer, an insulating strip 2 is arranged between the upper color-coated steel sheet 3 and the main grid 101. A thermal break component 5 is arranged between the main grid 101 and the lower color-coated steel sheet 4, in this way, the refrigeration capacity is difficult to deliver outward, hence, the insulation effect is good; Since adopting ceiling grid structure, and the main grid 101 places between the upper color-coated steel sheet 3 and lower color-coated steel sheet 4, is packed in the polyurethane insulating layer at the same time, in this way, polyurethane insulating layer will not produce flaw because of stress concentration, therefore, the suspended ceiling structure for a refrigerated storage has long service life; Because the upper surface and the lower surface of suspended ceiling structure for a refrigerated storage adopt color-coated steel sheet, consequently, the suspended ceiling structure for a refrigerated storage is artistic, safety, fireproofing, accord with the requirement of food hygienic standard. By adopting the construction method mentioned above, because the construction progress can be accomplished in continuous construction time, while the civil engineering suspended ceiling need to be accomplished after build upright, consequently, can increase the construction efficiency; Since the polyurethane insulating layers adopt the process of spraying in successive layers, in this way, the polyurethane is a jointless heat insulation layer, hence, the effect of heat insulation is well. Because did not arranged upright supported the suspended ceiling structure for a refrigerated storage, and the form of the suspended ceiling structure for the refrigerated storage can manufactured according to the form of the top of the refrigerated storage, consequently, the storage capacity is huge; when dispose thermal break component 5, since the connection between the upper screw bolt 502 the main grid 101 is weld, the connection between the joint steel strip 6 and the lower joint 503 is weld, welded temperature is high, adopting the disposure method of thermal break component 5 described above can guarantee the high impact Polypropylene insulation rod 501 against burning-out.

What is claimed is:

1. A suspended ceiling structure for a refrigerated storage, comprises: a ceiling grid which comprises a main grid, hanging members which are connected to the main grid and a refrigerated storage top; wherein an upper color-coated steel sheet is provided above the main grid, an insulating strip is arranged between the upper color-coated steel sheet and the main grid; a lower color-coated steel sheet is arranged below the main grid; a thermal break component is arranged between the main grid and the lower color-coated steel sheet; space is arranged between the upper color-coated steel sheets and lower color-coated steel sheets, in which polyurethane insulating layers are sprayed; the thermal break component comprises a heat insulation rod, an upper joint which is connected to the main grid and upper end part of the heat insulation rod, a lower joint which is connected to lower end part of the heat insulation rod and the lower color-coated steel sheet, the upper joint is an upper screw bolt, the lower joint is a lower screw bolt, the heat insulation rod is polypropylene insulation rod, an upper metal sleeve with internal thread is inlaid in the upper end part of the high impact Polypropylene insulation rod, a lower metal sleeve with internal thread is inlaid in the lower end part of the polypropylene insulation rod, the upper screw bolt connects to the polypropylene insulation rod through the upper metal sleeve, the lower screw bolt connects to the polypropylene insulation rod through the lower metal sleeve.

2. The suspended ceiling structure for a refrigerated storage according to claim 1, wherein the ceiling grid further includes an attachment grid, the attachment grid is a pyramid-formed grid, the tip of the pyramid-formed grid connects with the hanging members, the base of pyramid-formed grid connects with the main grid.

3. The suspended ceiling structure for a refrigerated storage according to claim 1, wherein a joint steel strip is connected to lower end of the lower joint, galvanized parts are arranged on the joint steel strip to install the lower color-coated steel sheet.

4. The suspended ceiling structure for a refrigerated storage according to claim 1, wherein the main grid is square-formed grid, the square-formed grid comprises main girder and secondary girder, the main girder is C-type steel, the secondary girder is angle iron, the secondary girder and the main grid are fixed together.

5. The suspended ceiling structure for a refrigerated storage according to claim 1, wherein the insulating strip is a polyurethane foam block.

6. A construction method of a suspended ceiling structure for a refrigerated storage, characterized in that: including at least the following steps:
(1) confirming a suspended point location, manufacture a main grid, and connecting the main grid with a hanging members;
(2) placing at least an insulating strip made of a polyurethane foam block on the main grid;

(3) providing an upper color-coated steel sheet on upper surface of the insulating strip as spraying substrate of the polyurethane;

(4) disposing thermal break component: an upper joint is connected to the main grid, a connection steel strip is connected to one end of a lower joint, afterwards, one end of a heat insulation rod is connected to the upper joint, the other end of the heat insulation rod is connected to the other end of the lower joint;

(5) spraying the polyurethane in successive layers on lower surface of the upper color-coated steel sheet, the spraying thickness of the first layer is 10-15 mm, the spraying thickness of the second layer is 15-25 mm, the spraying thickness of the third layer is 25-35 mm, the spraying thickness of each layer after the third layer is 25-35 mm until the polyurethane heat insulation layers are sprayed over;

(6) removing the polyurethane foam on the connection steel strip, connecting the galvanized parts with the connection steel strip, then, re-spraying the polyurethane on the polyurethane layers already sprayed;

(7) installing the lower color-coated steel sheet on the galvanized parts, during the disposing of the thermal break component, the upper joint is an upper screw bolt, the lower joint is a lower screw bolt, the heat insulation rod is polypropylene insulation rod; the upper screw bolt is welded on the main grid, the connection steel strip is welded with the lower end of the lower joint, afterwards, the polypropylene insulation rod is connected to the upper screw bolt through thread, in turn, the lower screw bolt is connected to the polypropylene insulation rod through thread.

7. The construction method of the suspended ceiling structure for a refrigerated storage according to claim 6, wherein a pyramid-formed grid is connected between the hanging members and the main grid, the cusp of pyramid-formed grid connects with hanging members, the base of pyramid-formed grid connects with the main grid.

8. The construction method of the suspended ceiling structure for a refrigerated storage according to claim 7, wherein the main grid is square-formed grid, the manufacturing method of the main grid is square-formed grid is: weld at least two main girders on the hanging members in parallel and transversely, then weld at least two secondary girder on the main girder longitudinally.

* * * * *